(12) United States Patent
Yu

(10) Patent No.: US 11,300,726 B1
(45) Date of Patent: Apr. 12, 2022

(54) DISPLAY MODULE AND DISPLAY DEVICE

(71) Applicant: JRD Communication (Shenzhen) LTD., Guangdong (CN)

(72) Inventor: Yang Yu, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 17/229,922

(22) Filed: Apr. 14, 2021

(30) Foreign Application Priority Data

Feb. 8, 2021 (CN) .......................... 202110184588.0

(51) Int. Cl.
*F21V 8/00* (2006.01)

(52) U.S. Cl.
CPC ......... *G02B 6/0093* (2013.01); *G02B 6/0043* (2013.01); *G02B 6/0065* (2013.01)

(58) Field of Classification Search
CPC ... G02B 6/0093; G02B 6/0043; G02B 6/0065
See application file for complete search history.

(56) References Cited

U.S. PATENT DOCUMENTS

| 2003/0117790 A1* | 6/2003 | Lee ...................... | G02B 6/0051 |
| | | | 362/617 |
| 2016/0109643 A1* | 4/2016 | Teragawa ............. | G02B 6/0061 |
| | | | 362/624 |
| 2018/0356687 A1* | 12/2018 | Ou ....................... | G02B 6/0043 |
| 2020/0217470 A1 | 7/2020 | Park et al. | |
| 2021/0181399 A1 | 6/2021 | Rinko | |

FOREIGN PATENT DOCUMENTS

| CN | 105739009 | A | * | 7/2016 | |
| CN | 105929480 | A | * | 9/2016 | |
| CN | 205880449 | | | 1/2017 | |
| EP | 2677237 | | | 12/2013 | |
| EP | 2677237 | A2 | * | 12/2013 | ............... F21V 3/04 |
| KR | 10-2021-0013064 | | | 2/2021 | |
| KR | 20210013064 | A | * | 2/2021 | ............. G02B 6/005 |

OTHER PUBLICATIONS

European Search Report and the European Search Opinion dated Jul. 6, 2021 From the European Patent Office Re. Application No. 21162911.8. (7 Pages).

* cited by examiner

*Primary Examiner* — Mary Ellen Bowman

(57) ABSTRACT

A display module includes a panel, a light guiding component, and an optical adhesive layer. The light guiding component includes a light guiding plate having a side facing the panel, and light guiding dots, equally spaced on the side of the light guiding plate. The optical adhesive layer positioned on the light guiding plate is transparent and has a side pasted on and connected to the panel and the side of the optical adhesive layer is comparatively far away from the light guiding component. This could prevent the optical adhesive from covering the light guiding layer of the light guiding component or prevent the refractive index of the flowing air layer from affecting the light transmission efficiency of the light guiding layer. Thus, the light transmission efficiency of the light guiding plate is raised and the display performance and the optical effect of the display module are raised.

18 Claims, 3 Drawing Sheets

B-B

DISPLAY MODULE AND DISPLAY DEVICE

CROSS REFERENCE

This application claims the priority of Chinese Patent Application No. 202110184588.0, entitled "DISPLAY MODULE AND DISPLAY DEVICE", filed on Feb. 8, 2021, the disclosure of which is incorporated herein by reference in its entirety.

FIELD OF THE INVENTION

The present invention relates to a display, and more particularly, to a display module and a display device.

BACKGROUND

As the development of the electronic devices, people are more concerned about whether the display screen will damage the eyes or not. The electronic devices could adopt the most advanced reflection-type display screen technique. The reflection-type display screen performs a reflection operation inside the display panel on the ambient light such that the display panel could display images. This reduces the influences upon the human eyes introduced by the LEDs in an ordinary display panel and thus reduces the eye fatigue in a certain degree.

However, in a conventional art, when the ambient light is not enough for the reflection-type display screen to perform the reflection operation. In other words, the reflection-type display screen cannot get enough light and thus its optical effect is reduced.

SUMMARY

One objective of an embodiment of the present invention is to provide a display module and a display device, capable of raising the transmission efficiency of light, such that the light could be sufficiently used to perform the reflection operation and the optical effect could be raised.

According to an embodiment of the present invention, a display module is disclosed. The display module comprises: a panel; a light guiding component and an optical adhesive layer. The light guiding component comprises a light guiding plate, having a side facing the panel; and a plurality of light guiding dots, equally spaced on the side of the light guiding plate. The optical adhesive layer is positioned on the side of the light guiding plate, wherein the optical adhesive layer is transparent and has a side pasted on and connected to the panel and the side of the transparent optical adhesive layer is comparatively far away from the light guiding component.

In some embodiments, the optical adhesive layer is a flexible glue that has a plurality of holes, and each of the holes correspondingly holds one of the plurality of light guiding dots, and wherein the flexible glue is pasted on and connected to the panel and the light guiding plate.

In some embodiments, the optical adhesive layer is a hard glue which is pasted on and connected to a top of the plurality of light guiding dots, and has a side pasted on and connected to the panel.

In some embodiments, the optical adhesive layer is a transparent cavity having a storage space; the transparent cavity comprises a transparent top surface, and a fixed side surface vertically extending from the transparent top surface; one side of the light guiding component having the plurality of light guiding dots faces the transparent cavity, an edge of the light guiding plate is connected to the fixed side surface, and a side of the transparent top surface comparatively far away from the light guiding component is connected to the panel.

In some embodiments, the fixed side surface of the transparent cavity is connected to the light guiding plate through spot gluing, and the transparent cavity and the light guiding plate form a closed light guiding cavity.

In some embodiments, a material of the transparent cavity is polyethylene terephthalate made by heat pressure.

In some embodiments, the panel comprises a display panel and a protection plate, the display panel and the protection plate are positioned oppositely; one side of the light guiding component having the plurality of light guiding dots faces the display panel; the optical adhesive layer is pasted on and connected to the display panel, and one side of the light guiding plate back on the display panel is connected to the protection plate through a soft glue.

In some embodiments, the panel comprises a display panel and a protection plate, the display panel and the protection plate are positioned oppositely; one side of the light guiding component having the plurality of light guiding dots faces the protection plate, the optical adhesive layer is pasted on and connected to the protection plate, and one side of the light guiding plate back on the protection plate is connected to the display panel through a soft glue.

In some embodiments, the display module further comprises a light source component, positioned on a side surface of the light guiding plate.

According to an embodiment of the present invention, a display device is disclosed. The display device comprises a shell, a power component and the above-mentioned component. The power supply component is electrically connected to the display module and the display module is embedded in the shell.

According to an embodiment of the present invention, the display module and the display device utilizes the optical adhesive layer on a side of the light guiding layer, where the light guiding component is placed. Furthermore, the optical adhesive layer is connected to the light guiding component such that the light guiding component is pasted on and connected to the panel through the optical adhesive layer. This could prevent the optical adhesive from covering the light guiding layer of the light guiding component or prevent the refractive index of the flowing air layer from affecting the light transmission efficiency of the light guiding layer. Thus, the light transmission efficiency of the light guiding plate is raised and the display performance and the optical effect of the display module are raised.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF PREFERRED EMBODIMENTS

Figure 1:
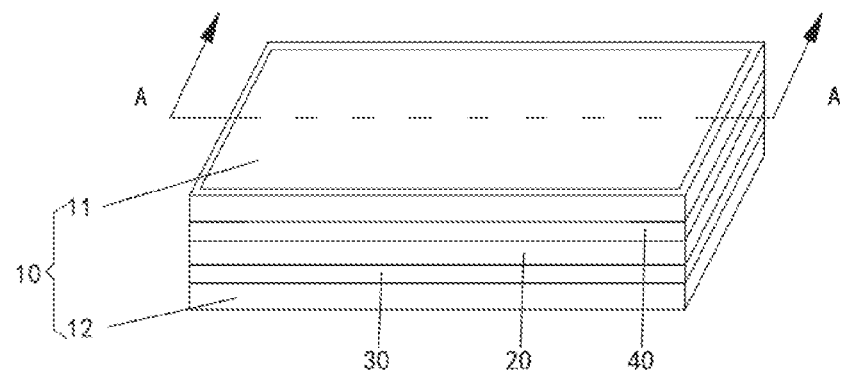
FIG. 1 is a diagram of a display module according to a first embodiment of the present invention.
Figure 2:
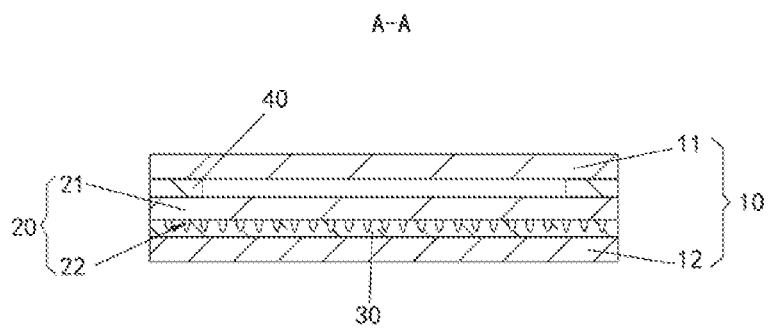
FIG. 2 is a cross-section diagram of A-A line of the display module shown in FIG. 1.

The invention is described below in detail with reference to the accompanying drawings, wherein like reference numerals are used to identify like elements illustrated in one or more of the figures thereof, and in which exemplary embodiments of the invention are shown. This invention may, however, be embodied in many different forms and should not be construed as limited to the particular embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

It should be understood that, when an element or layer is referred to herein as being "disposed on", "connected to" or "coupled to" another element or layer, it can be directly disposed on, connected or coupled to the other element or layer, or alternatively, that intervening elements or layers may be present. In contrast, when an element is referred to as being "directly disposed on," "directly connected to" or "directly coupled to" another element or layer, there are no intervening elements or layers present. In the figures, like numbers refer to like elements throughout. As used herein, the term "and/or" includes any and all combinations of one or more of the associated listed items.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

Please refer to FIG. 1 to FIG. 9. According to an embodiment of the present invention, a display module is disclosed. The display module comprises a panel 10, a light guiding component 20 and a transparent optical adhesive layer 30. The light guiding component 20 comprises a light guiding plate 21 and a plurality of light guiding dots 22. The light guiding dots 22 are equally spaced on a side of the light guiding plate 21. The side of the light guiding plate 21, where the light guiding dots 22 are positioned, faces the panel 10.

The optical adhesive layer 30 is positioned on the side of the light guiding plate, where the light guiding dots 22 are positioned. In addition, one side of the optical adhesive layer 30, which is comparatively far away from the light guiding component 20, is pasted on and connected to the panel 10.

In this embodiment, the display module is an integrated display module, which at least comprises a panel 10, a light guiding component 20, and an optical adhesive layer 30. The panel 10 comprises a display panel 11 and a protection plate 12.

The display panel 11 is a reflection-type display panel 11. The structure of the reflection-type display panel 11 comprises, in an order from the display surface to the inside: a polarizer, a λ/4 plate, a color filter substrate, an Indium Tin Oxide (ITO) electrode, an alignment layer, a LC layer, an alignment layer, a reflector layer, an electrode layer, a TFT array substrate. The reflection-type display panel 11 could use the ambient light or other external light to perform a reflection operation to display images.

The protection plate 12 could be a touch capacitor screen or a protection film. The touch capacitor screen could be used such that a user could control the content of the display panel 11 by touch. The protection film could be used to protect the inner structure of the display module.

The light guiding component 20 is a combination of a light guiding layer and a light guiding plate 21. The light guiding layer is fixed on any one side of the light guiding plate 21. The light guiding component 20 could comprise two light guiding layers. The two light guiding layers could be respectively positioned on two sides of the light guiding plate 21. That is, the light guiding component 20 comprises in order: one light guiding layer, the light guiding plate 21 and the other light guiding layer. The light guiding layers could raise the refractive index and thus raise the transmission efficiency.

In an embodiment, the light guiding layer could comprise a plurality of light guiding dots 22. The light guiding dots 22 are equally spaced on the light guiding plate 21. By arranging the light guiding dots 22 on the light guiding plate 21, the transmission efficiency for transmitting light to the reflection-type display panel 11 could be raise and thus the display effect of the display module could be raised. In this embodiment, the light guiding dots 22 are equally distributed on the light guiding plate 21 and the number of the light guiding dots 22 on the light guiding plate 21 is as many as possible. Through the condensed distribution of the light guiding dots 22 on the light guiding plate 21, the accuracy of light transmission could be raised.

In this embodiment, the optical adhesive layer 30 is between the panel 10 and the light guiding component 20 and positioned on the side of the light guiding plate 21 having the light guiding dots 22. In this way, the light guiding dots 22, which do not form a flat surface, could be pasted on and connected to the panel 10 through the optical adhesive layer 30. The optical adhesive layer 30 is transparent and could be made with a material of a good transparency. Or, the optical adhesive layer 30 could have multiple holes to allow light to pass through. In this embodiment, the light guiding layer of the light guiding component 20 is formed by the light guiding dots 22. When the transparency of the optical adhesive layer 30 is not enough, some holes could be formed, for example, through punching, on the optical adhesive layer 30 at the positions corresponding to the light guiding dots 22 on the light guiding plate 21 so allow more light to pass through the holes. That is, multiple holes are formed on the optical adhesive layer 30 and each of the holes is corresponding to one of the light guiding dots 22 at the corresponding position on the light guiding plate 21. This allows the light to be transmitted through the holes to the light guiding dots 22. When the transparency of the optical adhesive layer 30 is good, there is no need to have holes on the optical adhesive layer 30 because the light could efficiently pass through the optical adhesive layer and be transmitted to the light guiding dots 22. This could raise the optical effect of the display module.

Figure 3:
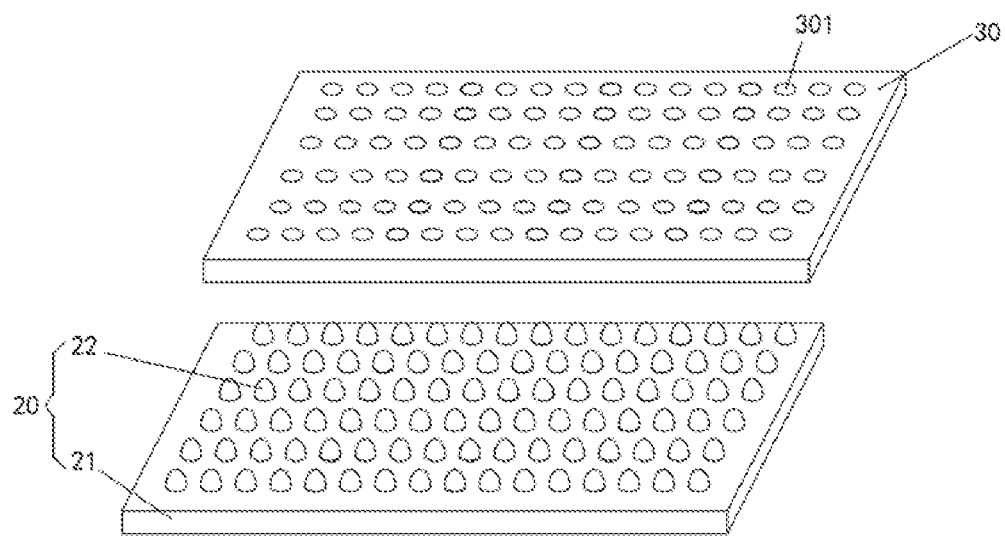
FIG. 3 is a diagram of the display module when the optical adhesive layer is a flexible adhesive glue.

Please refer to FIG. 3. The optical adhesive layer 30 is a flexible adhesive glue. There are multiple holes 301 on the flexible adhesive glue. Each of the holes correspondingly holds one of the light guiding dots 22. The flexible glue is respectively pasted on and connected to the panel 10 and the light guiding plate 21. Specifically, the flexible glue could be an optical adhesive glue. The holes 301 could be formed through punching the ordinary OCA glue at the locations corresponding to the light guiding dots 22 on the light guiding plate 21. The other regions are used for bonding. That is, all the regions between the holes of the adhesive glue is used for bonding. The bonding method is: each of the holes 301 of the flexible adhesive glue correspondingly holds one of the light guiding dots 22 of the light guiding plate 21 such that the adhesive glue could ensure that the light path is not blocked because the light is allowed to pass through the light guiding dots 22. Furthermore, the region between any two holes 301 of the adhesive glue is pasted on and connected to the light guiding plate 21 and the other side of the adhesive glue is pasted on and connected to the panel 10 such that the light guiding dots 22, which do not form a flat surface, on the light guiding plate 21 could be pasted on and connected to the panel 10.

Taking a side of the light guiding plate 21, which is far away from the light guiding dots 22, as the top, when the OCA adhesive glue is used, the thickness of the optical adhesive layer 30 could be equal to the distance from the top of the light guiding dots 22 on the light guiding plate 21 to the light guiding plate 21. The top of the light guiding dots 22 on the light guiding plate 21 touches the panel 10. This could prevent the flowing air from affecting the refraction index.

Figure 4:
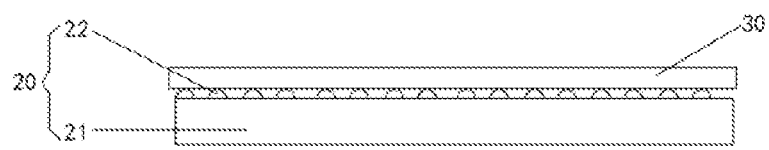
FIG. 4 is a diagram of the display module when the optical adhesive layer is a hard adhesive glue.

Please refer to FIG. 4. The optical adhesive layer 30 is a hard adhesive glue. The hard adhesive glue is pasted on and connected to the top of the light guiding dots 22. The other side of the hard adhesive glue is pasted on and connected to the panel 10. Specifically, the hard adhesive glue is a solid optical glue and has a good viscosity and transparency. In this embodiment, the end of the light guiding plate 21 far away from the light guiding dots 22 is taken as the top. One side of the solid optical glue is pasted on the top of the light guiding dots 22 of the light guiding plate 21 and the other side of the solid optical glue is pasted on the panel 10 such that the light guiding dots 22, which do not form a flat surface, on the light guiding plate 21 could be pasted on and connected to the panel 10.

Figure 5:
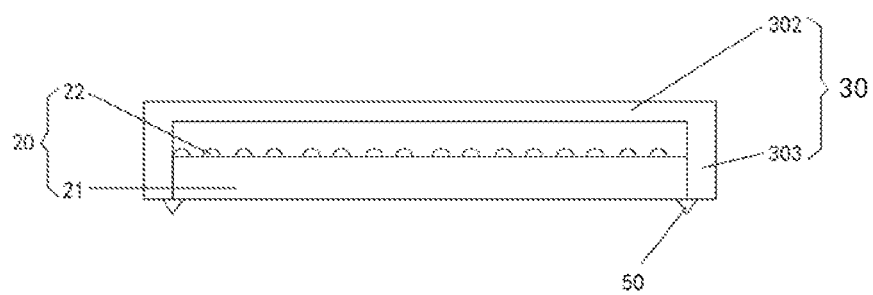
FIG. 5 is a diagram of the display module when the optical adhesive layer is a transparent cavity.
Figure 6:
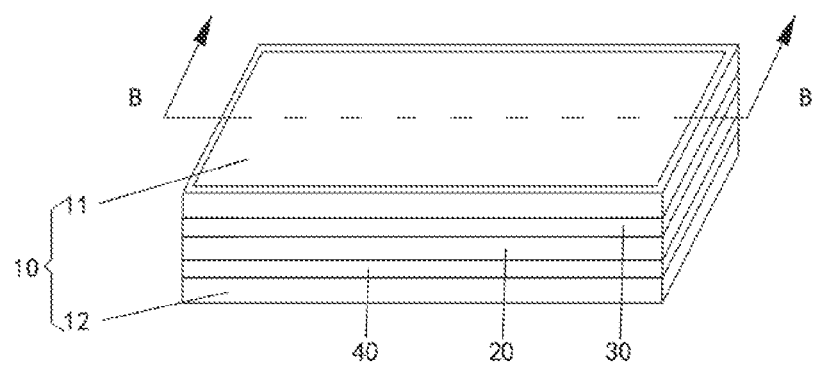
FIG. 6 is a diagram of a display module according to a second embodiment of the present invention.
Figure 7:
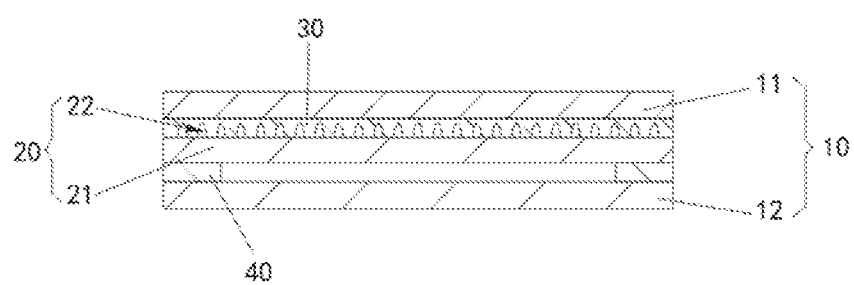
FIG. 7 is a cross-section diagram of B-B line of the display module shown in FIG. 6.

Please refer to FIG. 5. The optical adhesive layer is a transparent cavity having a storage space. The transparent cavity comprises a transparent top surface 302 and a fixed side surface 303 vertically extending from the edge of the transparent top surface 302. The side of the light guiding component 20 having the light guiding dots 22 is toward the inside of the transparent cavity. The edge of the light guiding plate 21 is connected to the fixed side surface 303. The side of the transparent top surface 302, which is comparatively far away from the light guiding component 20, is pasted on and connected to the panel 10. The optical adhesive layer 30 is a half cavity formed by five surfaces. The half cavity has a storage space. Take a rectangular half cavity as an example. The half cavity comprises a transparent top surface 203 and four fixed side surface 303. The four fixed side surfaces 303 are respectively connected to the edge of the transparent top surface 302 to form a half cavity having a storage space. The side of the light guiding plate 21 having the light guiding dots 22 is toward the inside of the cavity. In addition, the edge of the light guiding plate 21 is connected to the edge of the fixed side surfaces 303 of the cavity. For example, a glue could be used to connect the edge of the light guiding plate 21 to the edge of the fixed side surfaces 303 of the cavity such that the light guiding component 20 and the transparent cavity form a sealed cavity. The inner space of the cavity could be a vacuum and the light guiding dots 22 of the light guiding plate 21 are placed in the cavity. This could prevent the flowing air layer from affecting the refraction index when the light is transmitted to the light guiding dots 22.

The top surface of the transparent cavity is transparent. The light could be transmitted through the transparent top surface to the light guiding dots 22 on the light guiding plate 21. The light guiding dots 22 on the light guiding plate 21 could touch the inner side of the transparent top surface of the transparent cavity. Furthermore, because the light guiding plate 21 and the transparent cavity form a sealed cavity. This could prevent the flowing air layer from affecting the refraction index when the light is transmitted to the light guiding dots 22 and the light guiding plate 21. In another embodiment, the light guiding dots 22 on the light guiding plate 21 does not touch the inner side of the transparent top surface of the transparent cavity. But the side of the transparent top surface which is comparatively far away from the light guiding component 20 touches the panel 10 such that the light guiding dots 22, which do not form a flat surface, on the light guiding plate 21 could be pasted on and connected to the panel 10.

The fixed side surfaces of the transparent cavity and the light guiding plate 21 are fixed and connected through spot gluing. The transparent cavity and the light guiding plate 21 form a sealed cavity. In this embodiment, a spot gluing method could be used to connect the fixed side surfaces of the transparent cavity and the light guiding plate 21 to form a sealed transparent cavity. Using the spot gluing could raise the sealing effect of the light guiding cavity.

The material of the transparent cavity is polyethylene terephthalate (PET) made by heat pressure. The polyethylene terephthalate is a type of thermoplastic polyeter, which could efficiently block the air and has a good transparency. The transparent cavity made by this material could raise the light transmission efficiency and the optical effect such that the light could pass through the top surface of the transparent cavity to the light guiding dots 22 on the light guiding plate 21.

The panel 10 comprises a display panel 11 and a protection plate 12. The display panel 11 and the protection plate 12 are oppositely placed. One side of the light guiding component 20 having the plurality of light guiding dots 22 faces the display panel 11. The optical adhesive layer 30 is pasted on and connected to the display panel 11. One side of the light guiding plate 21 back on the display panel 11 is connected to the protection plate 12 through a soft glue 40. The soft glue 40 could be a foam glue. The structure of the foam glue is a frame structure with an opening in the middle.

One side of the frame structure of the foam glue is pasted on and connected to the edge of one side of the light guiding plate, which does not have the light guiding dots 22. The other side of the frame structure of the foam glue is pasted on and connected to the protection plate 12 to form the display module, which includes the display panel 11, the optical adhesive layer 30, the light guiding component 20 and the protection plate 12.

One side of the light guiding plate 21, which is back on the display panel 11, could be connected to the protection plate 12 through other components. For example, the solid optical glue could be used to connect the side of the light guiding plate 21, which is back on the display panel 11, to the protection plate 12. This change also obeys the spirit of the present invention.

In another embodiment, the panel 10 comprises a display panel 11 and a protection plate 12. The display panel 11 and the protection plate 12 are oppositely placed. One side of the light guiding component 20 having the plurality of light guiding dots 22 faces the protection plate 12. The optical adhesive layer 30 is pasted on and connected to the protection plate 12. One side of the light guiding plate 21 back on the protection plate 12 is connected to the display panel 11 through a soft glue 40. The soft glue 40 could be a foam glue. The structure of the foam glue is a frame structure with an opening in the middle. One side of the frame structure of the foam glue is pasted on and connected to the edge of one side of the light guiding plate, which does not have the light guiding dots 22. The other side of the frame structure of the foam glue is pasted on and connected to the display panel 11 to form the display module, which includes the display panel 11, the optical adhesive layer 30, the light guiding component 20 and the protection plate 12.

One side of the light guiding plate 21, which is back on the display panel 11, could be connected to the display panel 11 through other components. For example, the solid optical glue could be used to connect the side of the light guiding plate 21, which is back on the display panel 11, to the display panel 11. In addition, polyethylene terephthalate (PET) made by heat pressure could be used to form the adhesive layer to connect the light guiding plate 21 to the display panel 11. This change also obeys the spirit of the present invention.

Figure 8:
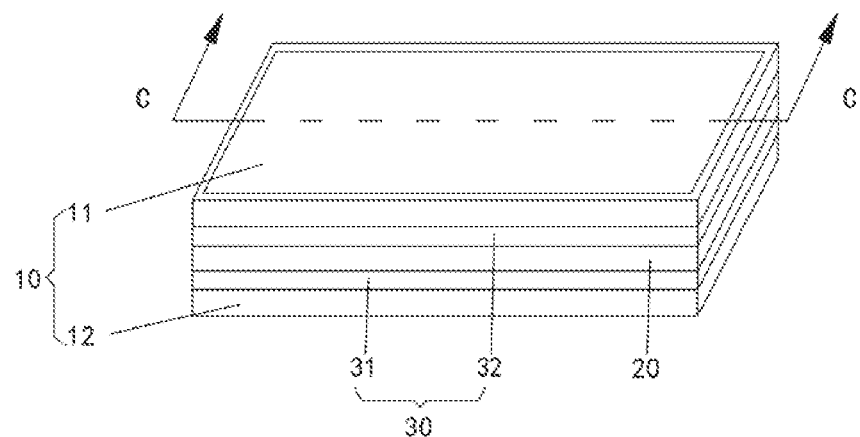
FIG. 8 is a diagram of a display module according to a third embodiment of the present invention.
Figure 9:
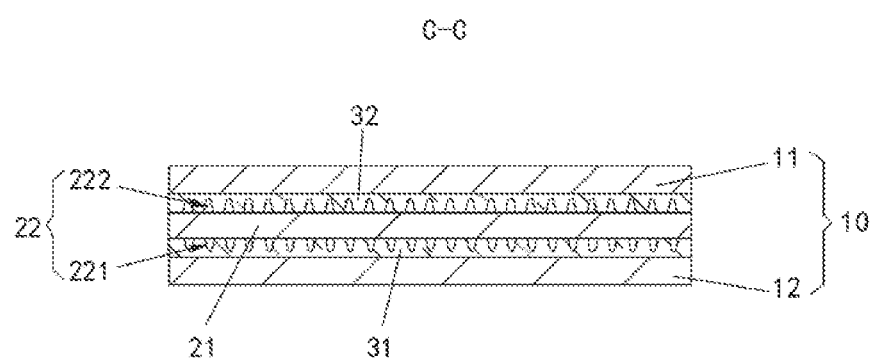
FIG. 9 is a cross-section diagram of C-C line of the display module shown in FIG. 8.

Please refer to FIG. 8 and FIG. 9. The two sides of the light guiding plate 21 respectively have a plurality of light guiding dots 22. The light guiding component 20 comprises: a light guiding plate 21, a first light guiding layer on one side of the light guiding plate 21, and a second light guiding layer on the other side of the light guiding plate 21. The first light guiding layer comprises a plurality of first light guiding dots 221. The second light guiding layer comprises a plurality of first light guiding dots 222. The panel 10 comprises a display panel 11 and a protection plate 12. The display panel 11 and the protection plate 12 are oppositely placed. The light guiding component 20 is placed between the display panel 11 and the protection plate 11. The first optical adhesive layer 31 is placed between the display panel 11 and the first light guiding dots 221 on the light guiding plate 21. The first adhesive layer 31 could make the first light guiding dots 221 (which do not form a flat surface) on the light guiding plate 21 pasted on and connected to the display panel 11. The second optical adhesive layer 32 is placed between the protection plate 12 and the second light guiding dots 222 on the light guiding plate 21. The second optical adhesive layer 32 could make the second light guiding dots 222 (which do not form a flat surface) on the light guiding plate 21 pasted on and connected to the protection plate 12. The first optical adhesive layer 31 and the second optical adhesive layer 32 could respectively be one of the optical adhesive glue (OCA), the solid optical glue, and the transparent cavity. The first optical adhesive layer 31 and the second optical adhesive layer 32 could be any combination of the above-mentioned types of adhesive materials. All changes obey the spirit of the present invention.

Furthermore, a light source component could be placed in the display module. The light source component could be placed at a side surface of the light guiding plate 21. The light source component could be a model or component of light emitting diodes and any other component that could provide light sources. This is just an example, not a limitation of the present invention. Through placing the light source component, it could ensure enough light source could be provided to the display module and could be more reliable.

According to an embodiment of the present invention, a display device is disclosed. The display device comprises a shell, a power component, and any one of the above-mentioned display module. The power component is electrically connected to the display module. The display module is embedded in the shell.

The display module comprises a panel 10, a light guiding component 20 and a transparent optical adhesive layer 30. The light guiding component 20 comprises a light guiding plate 21 and a plurality of light guiding dots 22. The light guiding dots 22 are equally spaced on the light guiding plate 21. The side of the light guiding plate 21, where the light guiding dots 22 are positioned, faces the panel 10. The optical adhesive layer 30 is positioned on the side of the light guiding plate, where the light guiding dots 22 are positioned. In addition, one side of the optical adhesive layer 30, which is comparatively far away from the light guiding component 20, is pasted on and connected to the panel 10. In an embodiment, the optical adhesive layer 30 is placed on the side of the light guiding component 20 having the light guiding layer. The optical adhesive layer 30 is connected to the light guiding component 20 such that the light guiding component 20 is pasted on and connected to the panel 10 through the optical adhesive layer 30. This prevent the optical adhesive glue from covering the light guiding layer of the light guiding component 20 or prevent the refraction index of the flowing air layer from affecting the light transmission efficiency of the light guiding layer in the light guiding component 20. This could raise the optical effect of the light guiding plate 21 and thus raises the display performance of the display module.

Above are embodiments of the present invention, which does not limit the scope of the present invention. Any modifications, equivalent replacements or improvements within the spirit and principles of the embodiment described above should be covered by the protected scope of the invention.

While the embodiments of the present disclosure have been shown and described above, it is to be understood that the above embodiments are exemplary and are not to be construed as limiting the present disclosure. One of ordinary skill in the art may make variations, modifications, substitutions and alterations to the above embodiments within the scope of the present disclosure.

What is claimed is:
1. A display module, comprising:
   a panel;
   a light guiding component, comprising:
      a light guiding plate, having a side facing the panel; and a plurality of light guiding dots, equally spaced on the side of the light guiding plate; and an optical adhesive layer, positioned on the side of the light guiding plate, wherein the optical adhesive layer is transparent and has a side pasted on and connected to the panel and the side of the optical adhesive layer is comparatively far away from the light guiding component, wherein a thickness of the optical adhesive layer is equal to a distance from a top of the light guiding dots on the light guiding plate to the light guiding plate, and the top of the light guiding dots touches the panel.

2. The display module of claim 1, wherein the optical adhesive layer is a flexible glue that has a plurality of holes, and each of the holes correspondingly holds one of the plurality of light guiding dots, and wherein the flexible glue is pasted on and connected to the panel and the light guiding plate.

3. The display module of claim 1, wherein the optical adhesive layer is a hard glue which is pasted on and connected to a top of the plurality of light guiding dots, and has a side pasted on and connected to the panel.

4. The display module of claim 1, wherein the optical adhesive layer is a transparent cavity having a storage space; the transparent cavity comprises a transparent top surface, and a fixed side surface vertically extending from the transparent top surface; one side of the light guiding component having the plurality of light guiding dots faces the transparent cavity, an edge of the light guiding plate is connected to the fixed side surface, and a side of the transparent top surface comparatively far away from the light guiding component is connected to the panel.

5. The display module of claim 4, wherein the fixed side surface of the transparent cavity is connected to the light guiding plate through spot gluing, and the transparent cavity and the light guiding plate form a closed light guiding cavity.

6. The display module of claim 4, wherein a material of the transparent cavity is polyethylene terephthalate made by heat pressure.

7. The display module of claim 2, wherein the panel comprises a display panel and a protection plate, the display panel and the protection plate are positioned oppositely; one side of the light guiding component having the plurality of light guiding dots faces the display panel; the optical adhesive layer is pasted on and connected to the display panel, and one side of the light guiding plate back on the display panel is connected to the protection plate through a soft glue.

8. The display module of claim 2, wherein the panel comprises a display panel and a protection plate, the display panel and the protection plate are positioned oppositely; one side of the light guiding component having the plurality of light guiding dots faces the protection plate, the optical adhesive layer is pasted on and connected to the protection plate, and one side of the light guiding plate back on the protection plate is connected to the display panel through a soft glue.

9. The display module of claim 1, further comprising:
a light source component, positioned on a side surface of the light guiding plate.

10. A display device comprising:
a shell;
a power supply component; and
a display module, comprising:
a panel;
a light guiding component, comprising:
a light guiding plate, having a side facing the panel; and a plurality of light guiding dots, equally spaced on the side of the light guiding plate; and an optical adhesive layer, positioned on the side of the light guiding plate, wherein the optical adhesive layer is transparent and has a side pasted on and connected to the panel and the side of the optical adhesive layer is comparatively far away from the light guiding component;

wherein a thickness of the optical adhesive layer is equal to a distance from a top of the light guiding dots on the light guiding plate to the light guiding plate, and the top of the light guiding dots touches the panel;

wherein the power supply component is electrically connected to the display module and the display module is embedded in the shell.

11. The display device of claim 10, wherein the optical adhesive layer is a flexible glue that has a plurality of holes, and each of the holes correspondingly holds one of the plurality of light guiding dots, and wherein the flexible glue is pasted on and connected to the panel and the light guiding plate.

12. The display device of claim 10, wherein the optical adhesive layer is a hard glue which is pasted on and connected to a top of the plurality of light guiding dots, and has a side pasted on and connected to the panel.

13. The display device of claim 10, wherein the optical adhesive layer is a transparent cavity having a storage space; the transparent cavity comprises a transparent top surface, and a fixed side surface vertically extending from the transparent top surface; one side of the light guiding component having the plurality of light guiding dots faces the transparent cavity, an edge of the light guiding plate is connected to the fixed side surface, and a side of the transparent top surface comparatively far away from the light guiding component is connected to the panel.

14. The display device of claim 13, wherein the fixed side surface of the transparent cavity is connected to the light guiding plate through spot gluing, and the transparent cavity and the light guiding plate form a closed light guiding cavity.

15. The display device of claim 13, wherein a material of the transparent cavity is polyethylene terephthalate made by heat pressure.

16. The display device of claim 11, wherein the panel comprises a display panel and a protection plate, the display panel and the protection plate are positioned oppositely; one side of the light guiding component having the plurality of light guiding dots faces the display panel; the optical adhesive layer is pasted on and connected to the display panel, and one side of the light guiding plate back on the display panel is connected to the protection plate through a soft glue.

17. The display device of claim 11, wherein the panel comprises a display panel and a protection plate, the display panel and the protection plate are positioned oppositely; one side of the light guiding component having the plurality of light guiding dots faces the protection plate, the optical adhesive layer is pasted on and connected to the protection plate, and one side of the light guiding plate back on the protection plate is connected to the display panel through a soft glue.

18. The display device of claim 10, wherein the display module further comprises:
a light source component, positioned on a side surface of the light guiding plate.

* * * * *